(12) United States Patent
Brebner

(10) Patent No.: US 7,289,993 B2
(45) Date of Patent: Oct. 30, 2007

(54) METHOD AND AGENT FOR MANAGING PROFILE INFORMATION

(75) Inventor: Gavin Brebner, St. Martin d'Uriage (FR)

(73) Assignee: Hewlett-Packard Development Company L.P., Houston, TX (US)

( * ) Notice: Subject to any disclaimer, the term of this patent is extended or adjusted under 35 U.S.C. 154(b) by 388 days.

(21) Appl. No.: 10/759,390

(22) Filed: Jan. 16, 2004

(65) Prior Publication Data

US 2005/0108273 A1  May 19, 2005

(30) Foreign Application Priority Data

Jan. 21, 2003 (EP) .................. 03290150

(51) Int. Cl.
*G06F 7/00* (2006.01)
(52) U.S. Cl. .............................. 707/9; 707/10
(58) Field of Classification Search .......... 707/1–104.1
See application file for complete search history.

(56) References Cited

U.S. PATENT DOCUMENTS

| | | | | |
|---|---|---|---|---|
| 5,704,044 A | * | 12/1997 | Tarter et al. ................ 705/4 |
| 6,061,451 A | * | 5/2000 | Muratani et al. ........... 380/201 |
| 6,640,249 B1 | * | 10/2003 | Bowman-Amuah ......... 709/228 |
| 2002/0010679 A1 | * | 1/2002 | Felsher ....................... 705/51 |
| 2003/0101088 A1 | * | 5/2003 | Lohavichan | |
| 2005/0108273 A1 | * | 5/2005 | Brebner ...................... 707/102 |

* cited by examiner

*Primary Examiner*—Don Wong
*Assistant Examiner*—Linh Black
(74) *Attorney, Agent, or Firm*—Ladas & Parry, LLP

(57) ABSTRACT

A method of and apparatus for managing user profile information. Dummy information is first supplied to a remote profile database. Then a service operable to request the user's profile information from the remote profile database is accessed and correct user profile information is supplied to the remote profile database to update the previously supplied dummy user profile information with correct user profile information. After the service accesses the correct user profile information, dummy information is again supplied to the remote profile database to update the previously supplied correct user profile information with dummy user profile information.

21 Claims, 3 Drawing Sheets

METHOD AND AGENT FOR MANAGING PROFILE INFORMATION

FIELD OF THE INVENTION

This invention relates to a method of managing profile information, an agent for managing profile information and a module for managing profile information, particularly but not exclusively for supplying information to a remote profile database over the Internet.

BACKGROUND OF THE INVENTION

To obtain access to services, particularly where offered over the Internet, it is generally required for a user to supply personal information. This information may include such details as the user's name, address and other contact details, financial information and in many cases personal preference information, such as a user's likes and dislikes. This information may be used by a company or other organisation providing a service to identify a user, personalise the service offered to that user and charge the user for the service if required.

When a user wishes to access several different services, it has often been necessary to supply personal information to each individual service. This requires the user to supply the same data several times, and may lead to problems in updating all copies of information when required. To overcome these difficulties, it is known to provide remote profile systems, which store remote profile databases holding the user information described above. This information is then made available to other appropriately validated and authorised systems or services, so that a user does not have to repeatedly supply the same information or provide appropriate authorisation to different services during a single session. Such remote profile systems are, for example, AOL MagicCarpet, Microsoft Passport or the proposed Liberty Alliance system.

A source of concern is actually that the personal information stored on a remote profile database is vulnerable to unauthorised, or even perhaps authorised but undesirable use, such as unauthorised access to the site, data mining techniques or other leaks of information.

An aim of the present invention is to provide a new or improved method of managing profile information.

SUMMARY OF THE INVENTION

According to a first aspect of the invention, we provide a method of managing profile information comprising the steps of supplying dummy information to a remote profile database, accessing a service operable to request profile information from the remote profile database and supplying correct information to the remote profile database, and, after accessing the service, supplying dummy information to the remote profile database.

The method may comprise the step of detecting a service request and generating an update request to send correct information to the remote profile database.

The method may comprise the step of supplying the correct information to the remote profile database in response to the update request.

The method may comprise the step of detecting the end of the service access and generating a dummy information update request.

The method may comprise the step of supplying dummy information to the remote profile database in response to the dummy information update request.

The method may comprise the step of storing correct information in a local database.

According to a second aspect of the invention, we provide an agent for managing profile information, the agent being operable to supply dummy information to a remote profile database and to supply correct information to a remote profile database.

The agent may be operable to supply correct information to a remote profile database in response to an update request.

The agent may be operable to supply dummy information to a remote profile database in response to a dummy information update request.

The update request and/or the dummy information update request may be generated by a user.

The update request and/or the dummy information update request may be generated in response to a service access.

The agent may be operable to display the status of the information supplied to the remote profile database to a user.

The agent may be operable to read a local database to obtain the correct information and supply the correct information to a remote profile database.

According to a third aspect of the invention, we provide a computer, the computer being operable to access a service via the Internet, the computer being provided with an agent according to the second aspect of the invention.

According to a fourth aspect of the invention, we provide a module for managing profile information, the module being operable to detect a service request indication and generate an update request to provide correct information to a remote profile database.

The module may be operable to transmit the update request to an agent provided on a user's computer.

The service request indication may comprise a service request transmitted to a service.

The service request information may comprise a request transmitted from a server to the remote profile database.

According to a fifth aspect of the invention, we provide a proxy server, the server being operable to communicate with a user's computer and the Internet, the server being provided with a module.

According to a sixth aspect of the invention, we provide a system comprising a computer according to the third aspect of the invention and a proxy server according to the fifth aspect of the invention.

BRIEF DESCRIPTION OF THE DRAWINGS

Embodiments of the present invention will now be described by way of example only with reference to the accompanying drawings wherein.

DETAILED DESCRIPTION OF THE PREFERRED EMBODIMENTS

Figure 1:
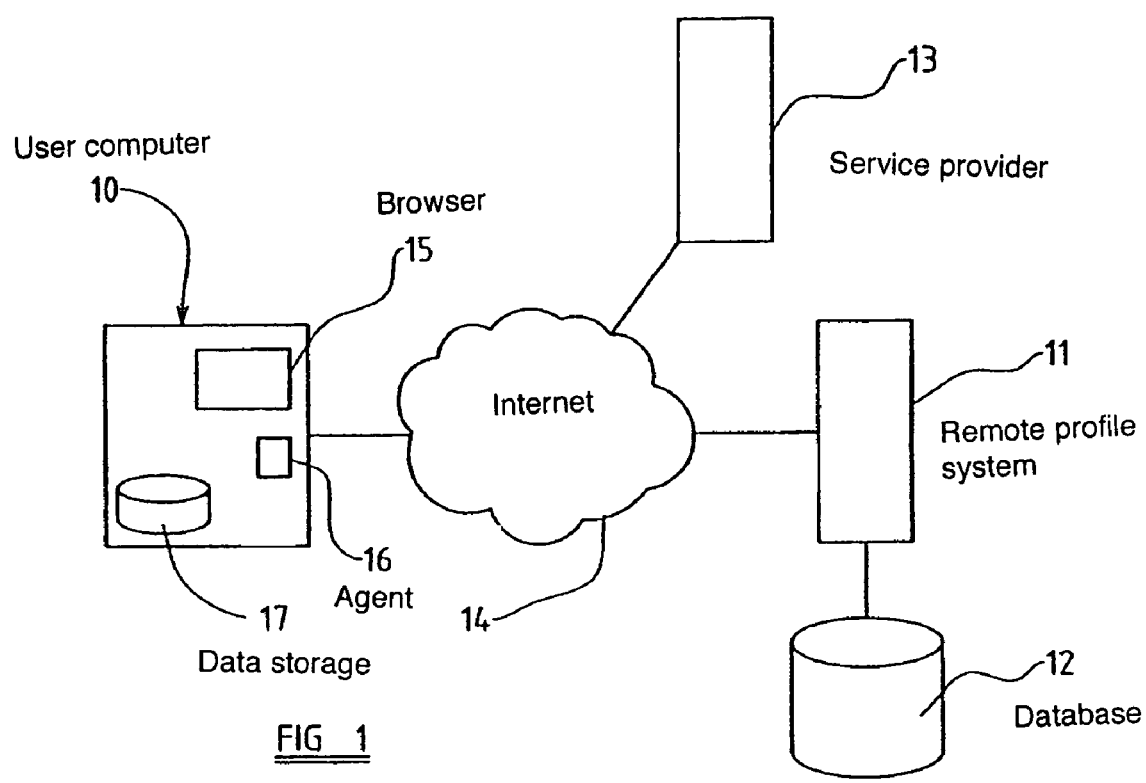
FIG. 1 is diagrammatic illustration of a system embodying the present invention.

Referring now to FIG. 1, a user's computer such as a personal computer is shown at 10. A remote profile system is shown at 11 which is connected to a remote profile database 12, and a service provider system is shown at 13. The computer 10, the remote profile database 12 and the profile system 13 are all able to communicate via the Internet 14.

The computer 10 is provided with a browser shown at 15, an agent as shown at 16 and a local data storage medium, for example a hard disk drive, on shown at 17 on which is stored a correct set of profile information relating to a user of the computer 10.

When it is not desired to make use of a service, the profile information supplied to the remote profile system 11 and held on the remote profile database 12 is generally made incorrect or "obfuscated". The data may be for example random strings of characters, or aliases referring to the correct data in the correct data information, or wrong but seemingly correct data indicating or corresponding to the remote profile system. In the latter case, if a data leak becomes apparent, it will be clear whether or not the remote profile system 11 is the source. In this specification, all incorrect profile information however generated or encoded will be referred to as "dummy data".

Figure 2:
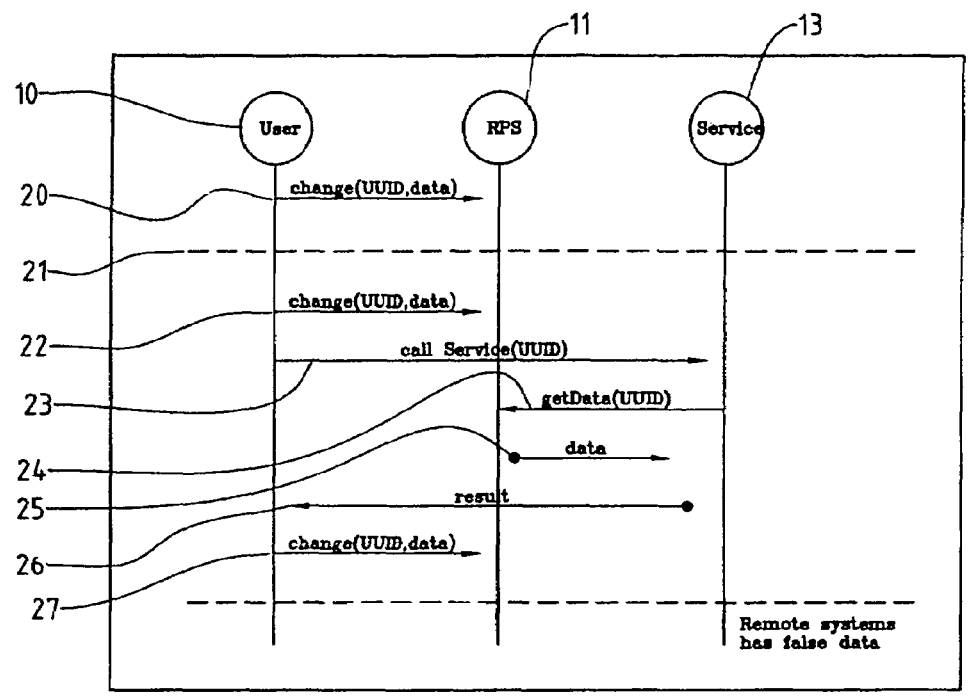
FIG. 2 is a sequence diagram showing a method of managing profile information on the system of FIG. 1 and embodying the present invention.

Referring now to FIG. 2, the method is performed as follows. At step 20, the transmission of dummy data from the user's computer 10 to the remote profile system 11 is indicated. Since the remote profile system 11 must permit users to access and change their own data, for data to be updated by the user, the user of the computer 10 can do this as a matter of right.

At step 21, a user of the computer 10 wishes to begin a session where he accesses the service provided by the service system 13. At step 22, the correct data is read from the local data storage medium 17 and transmitted to the remote profile system 11 where it is stored on the remote profile database 12. The user then transmits a service request 23 to the service system 13, for example by using the browser 15 to access a website hosted by the service system 13. At step 24 the service system 13 will contact the remote profile system 11 to retrieve profile information corresponding to the user of the computer 10 and at step 25 this, currently correct, data is read from the remote profile database 12 and returned to the service system 13. The service will transmit an appropriate response or result to the user computer 10. At the end of the session, the user of the computer 10 will once again transmit dummy data to the remote profile system 11 to be stored in the remote profile database 12.

Figure 1A:
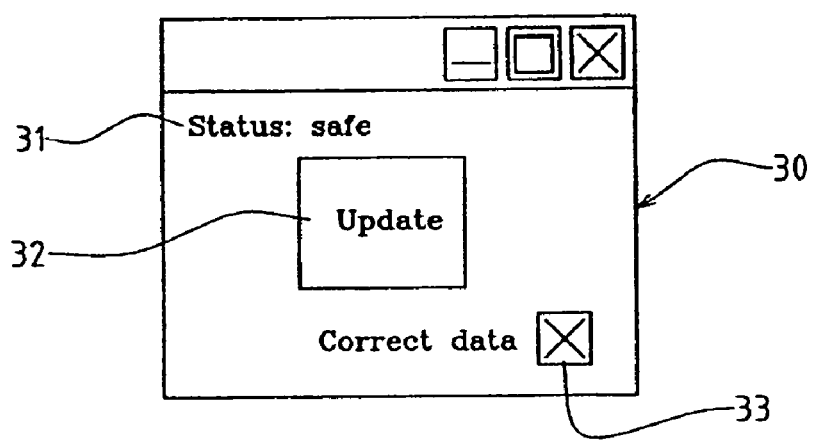
FIG. 1a is an example display showing the status of the data held in the profile system.

The steps 20, 22, 27 transmitting dummy data or correct profile information as appropriate may be done manually, that is by a user, by for example accessing a website to pass the information to the remote profile system 11. However, such steps may preferably be handled by an agent 16 which stores an address of the remote profile system 11 and which is operable to transmit correct or dummy data to the remote profile system 11. In an example display shown at 30 in FIG. 1a the agent 16 may generate a display showing at 31 the status of the data held on the remote profile system 11, a button 32 which the user may click on to update the data on the remote profile server 11, and a check box 33 to select whether correct or dummy data is sent. Thus, at steps 20, 22 and 27, the steps of transmitting correct or dummy data to the profile system may be performed by the agent 16 in response the user generating an update request to send correct information or a dummy update request to send dummy data by clicking on the button 32 of the display 30. A button 32 or display 30 may be associated with an individual item of data or a group of data, or may be associated with all the information held on one profile system or a plurality of remote profile systems.

It might alternatively be envisaged that the transmission of correct information or dummy data to the remote profile system 11 is performed automatically in response to a service request indication, that is some indication or event showing that the user of the user computer 10 is attempting to access a service provided by a service system which is operable to retrieve profile information from the remote profile system 11.

Figure 3:
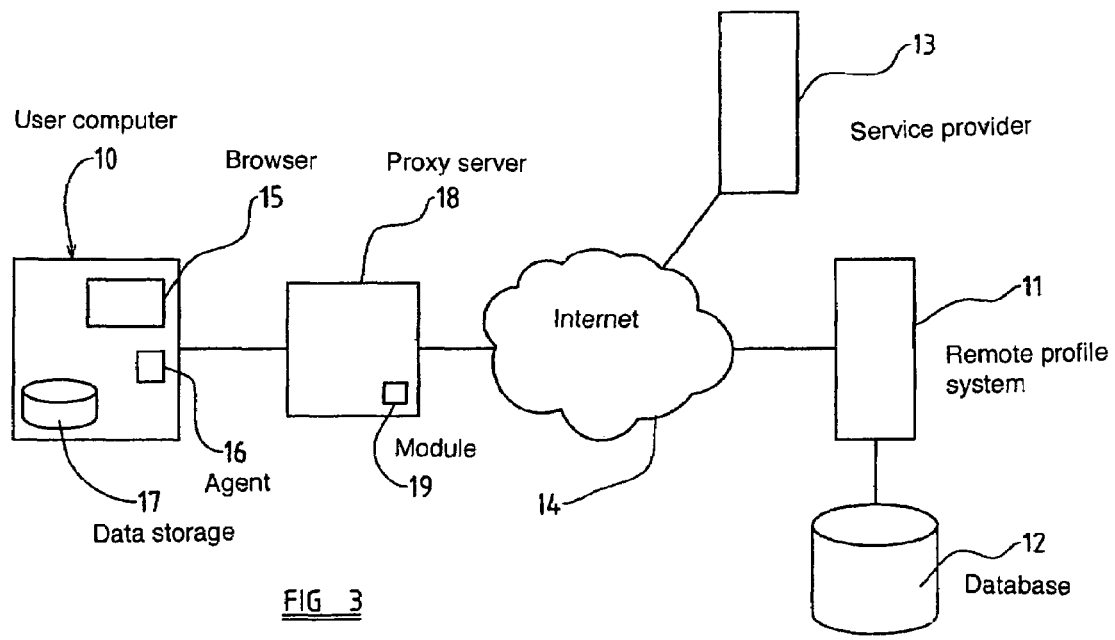
FIG. 3 is a diagrammatic illustration of a further system embodying the present invention.

In an embodiment of the invention described with reference to FIGS. 3 and 4, this automatic detection of attempts to access a service is performed by a proxy server. As shown in FIG. 3, the system is the same as that of FIG. 1 except that the computer 10 accesses the Internet 14 via a proxy server 18 provided with a module for managing profile information shown at 19. Such proxy servers are known wherein when a user's access to the Internet 14 is routed via a proxy server which may perform filtering, monitoring or personalisation roles.

Figure 4:
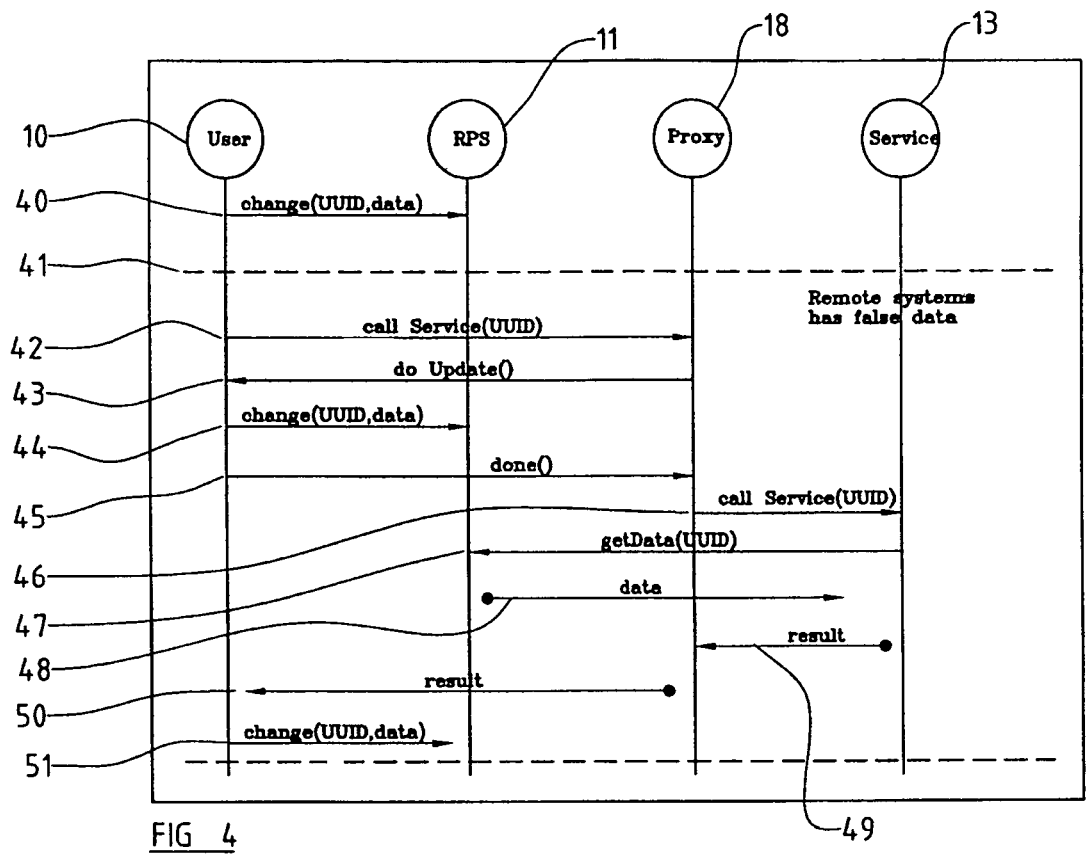
FIG. 4 is a sequence diagram showing a method of handling profile information for the system of FIG. 3 and embodying the present invention.

In the embodiments of FIG. 3 and FIG. 4, the module 19 is operable to detect a service request indication in the form of a service request generated by the computer 10 to be transmitted to the service system 13.

Referring to FIG. 4, as in the method of FIG. 2, the user transmits dummy data to the remote profile system 11, for example by using an agent 16 as described hereinbefore. At step 41 the user begins a session in which he wishes to access the service provided by the service system 13. At step 42, a service request is generated, for example by a user of the computer 10 using the browser 15 to access a website hosted by the service system 13. The service request is passed to the proxy server 18 in conventional manner, which detects the service request and transmits an update request 43 to the user's computer 10. This update request is received by the agent 16, which at step 44 transmits the correct data to the remote profile system 11, and when this is complete transmits an update complete report 45 to the proxy server 18. The proxy server 18 then forwards the service request to the service system 13 at step 46. As in FIG. 2, the service system 13 transmits a request for profile information shown at step 47 to the remote profile system 11 and this information is returned at step 48. The service system then returns a result at step 49 to the proxy server 18 which forwards the result at step 50 to the user computer 10. As part of the result 50, the proxy server may transmit a dummy information update request which is detected by the agent 16 and at step 51 the dummy data is transmitted to the remote profile system 11. Alternatively, it will be apparent that the step of transmitting dummy data to the remote profile system may be performed by the agent 16 detecting the returned result at step 50, or by the user instructing the agent 16 to transmit dummy data as discussed hereinbefore, for example by means of a display such as that shown in FIG. 1a.

In this embodiment, the correct profile information might alternatively be stored on the proxy server 18 and the step of transmitting correct or dummy data to the remote profile system 11 may be performed by an agent located on the proxy server 18. The advantage of maintaining the profile information on the user computer 10 however is that the profile information is stored locally and under the control of the user.

Figure 5:
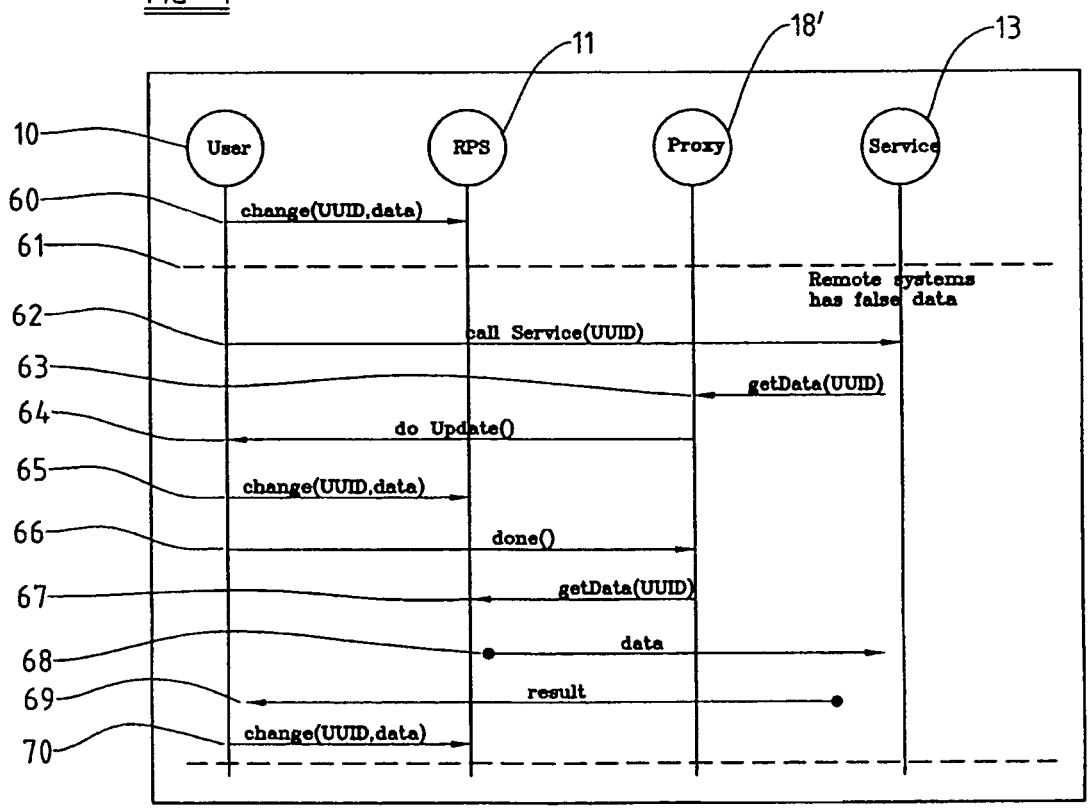
FIG. 5 is a sequence diagram illustrating a further method embodying the present invention.

A further method embodying the present invention is illustrated by the sequence diagram of FIG. 5. In this alternative, the communications between the service system 13 and the remote profile system 11 are passed through a proxy 18' which is operable to detect a service request indication in the form of a request from the service system to the remote profile system for profile information, generally but not necessarily always as a result of a service request generated by the user's computer 10. In the method of FIG. 5, at 60 as in the diagrams of FIGS. 2 and 4, dummy information is transmitted to the remote profile system, for example by manual or automatic operation of an agent 16 as discussed hereinbefore. At 61, a session in which the user computer 10 attempts to contact the service system 13 begins, and at step 62 a service request is transmitted to the service system 13. The service system 13 transmits a profile request at step 63 directed to the remote profile system 11. The profile request is received by the proxy 18' and is identified by the proxy 18' as a service request indication. At step 63, the proxy 18' generates an update request to the user computer 10 and at step 64 correct that data is transmitted to the remote profile system 11 in response to the update request, for example through automatic detection of the update request by an agent 16, or by a user manually instructing the agent 16 to perform the update. When the correct information has been passed to the remote profile system 11 as shown at 65, a confirmation is transmitted to the proxy 18' at step 66, which at step 67 passes the profile information request to the remote profile system 11. At step 68 the profile information is transmitted from the remote profile system to the service system 13, and at step 69 the results of the service are transmitted to the user computer 10. At step 70, on completion of the session, dummy data is once again transmitted to the remote profile system 11, for example as a result of automatic detection of the end of the session by the agent 16, or in a response to a dummy information update request generated by the proxy 18, or by the user instructing the agent 16 to perform the update.

It will be apparent that any update policy may be used as desired. Although in the examples discussed hereinbefore the remote profile system is updated with correct data only for the duration of a session and then the correct data is replaced with dummy data, it might be envisaged that other update policies might be used. For example, correct information and dummy data might be updated at random intervals, and different dummy data sets might be used. In this manner, it is rendered more difficult for any tracker or data monitor to distinguish correct and dummy data. To further obscure the difference between dummy and correct information, it might be envisaged that updates are associated with fake service calls.

Thus, in accordance with the present invention, personal profile information held on a remote profile server is obscured or blurred. Although the present invention will not defeat all attempts to gain unauthorised access to or use of personal details stored in the profile information, it will help reduce the risk of personal data being made available or used in an unauthorised manner or otherwise undesirable and will obscure the validity of any data which is released or accessed in such a manner.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of managing profile information comprising the steps of:
   supplying dummy information to a remote profile database,
   accessing a service operable to request profile information from the remote profile database
   supplying correct information to the remote profile database to update the previously suppled dummy information with the correct information, and,
   after accessing the service, supplying dummy information to the remote profile database to update the previously suppled correct information with dummy information.

2. A method according to claim 1 further comprising the step of detecting a service request and, in response, automatically generating an update request to send said correct information to the remote profile database.

3. A method according to claim 2 comprising the step of supplying the correct information to the remote profile database in response to the update request.

4. A method according to claim 1, comprising the step of detecting the end of the service access and generating a dummy information update request.

5. A method according to claim 4 comprising the step of supplying dummy information to the remote profile database in response to the dummy information update request.

6. A method according to claim 1 comprising the step of storing correct information in a local database.

7. An agent embodied in computer readable media for managing profile information, the agent being operable to:
   supply dummy information to a remote profile database;
   supply correct information to the remote profile database to update previously supplied dummy information with the to allow thereby third party access to the correct information; and supply dummy information to the remote profile database to update the previously supplied correct information with dummy information to deny third party access to the correct information correct information.

8. An agent according to claim 7 operable to supply said correct information to a remote profile database in response to an update request.

9. An agent according to claim 7 wherein the agent is operable to supply dummy information to the remote profile database in response to a dummy information update request to update the previously suppled correct information with the dummy information.

10. An agent according to claim 8 wherein the update request and/or the dummy information update request are generated by a user.

11. An agent according to claim 8 wherein the update request and/or the dummy information update request are generated in response to a service access.

12. An agent according to claim 7 operable to display the status of the information supplied to the remote profile database to a user.

13. An agent according to claim 7 operable to read a local database to obtain the correct information and supply the correct information to the remote profile database to update the previously suppled dummy information with the correct information.

14. A computer, the computer being operable to access a service via the Internet, the computer being provided with an agent according to claim 8.

15. A Computer readable media including a module for managing profile information, the module being operable to detect a service request indication and generate an update request to provide correct information to a remote profile database to update previously supplied dummy information stored at said remote profile database with said correct information and being further operable to detect an another service request indication and generate another update request to provide dummy information to the remote profile database to replace the previously supplied correct information stored at said remote profile database with dummy information.

16. A Computer readable media including a module according to claim 15 operable to transmit the update request to an agent provided on a user's computer.

17. A Computer readable media including a module according to claim 15 wherein the service request indication comprises a service request transmitted to a service available on the Internet.

18. A Computer readable media including a module according to claim 15 wherein the service request information comprises a request for profile information transmitted from a server to the remote profile database.

19. A proxy server, the server being operable to communicate with a user's computer and the Internet, the server being provided with a module for managing profile information, the module being operable to detect a service request indication and generate an update request to provide correct information to a profile database to update previously supplied dummy information stored at said profile database with said correct information and being further operable to detect an another service request indication and generate another update request to provide dummy information to the remote profile database to replace the previously supplied correct information stored at said remote profile database with dummy information.

20. A system comprising a computer being operable to access a service via the Internet, the computer being provided with an agent according to claim 8; and a proxy server the proxy server being operable to communicate with a user's computer and the Internet, the server being provided with a module for managing profile information, the module being operable to detect a service request indication and generate an update request to provide correct information to a remote profile database.

21. A method of obfuscating user profile information stored on a remote profile system comprising:
   (a) loading said remote profile system with profiles of users, the profiles normally containing dummy profile information regarding said users; and
   (b) updating profile information of a particular user to reflect correct profile information regarding said particular user during a period of time when said particular user allows a third party to access the user's correct profile information temporarily available on said remote profile system, after which third party access the profile information of the particular user is updated to comprise dummy information.

* * * * *